United States Patent
Myers et al.

(10) Patent No.: US 9,691,201 B2
(45) Date of Patent: Jun. 27, 2017

(54) WIRELESS DEVICE ENABLED LOCKING SYSTEM

(71) Applicant: Delphian Systems, LLC, Buffalo Grove, IL (US)

(72) Inventors: Gary L. Myers, Monee, IL (US); Ashok Hirpara, Carol Stream, IL (US); John D. Veleris, Northbrook, IL (US); Arkadiusz Zimny, South Elgin, IL (US); Michael Aaron Cohen, Buffalo Grove, IL (US); Eugene Nakshin, Round Lake, IL (US)

(73) Assignee: DELPHIAN SYSTEMS, LLC, Buffalo Grove, IL (US)

( * ) Notice: Subject to any disclaimer, the term of this patent is extended or adjusted under 35 U.S.C. 154(b) by 0 days.

(21) Appl. No.: 14/792,760

(22) Filed: Jul. 7, 2015

(65) Prior Publication Data

US 2016/0019735 A1    Jan. 21, 2016

Related U.S. Application Data

(63) Continuation of application No. 13/162,334, filed on Jun. 16, 2011, now Pat. No. 9,077,716.
(Continued)

(51) Int. Cl.
*G07C 9/00* (2006.01)
*H04L 29/06* (2006.01)
(Continued)

(52) U.S. Cl.
CPC ..... *G07C 9/00103* (2013.01); *G07C 9/00007* (2013.01); *G07C 9/00571* (2013.01);
(Continued)

(58) Field of Classification Search
CPC ... H04L 63/101; H04L 63/0876; H04L 63/08; G06C 9/0007; G07C 2009/00412
See application file for complete search history.

(56) References Cited

U.S. PATENT DOCUMENTS

| 6,927,684 B2 | 8/2005 | Joyner et al. |
| 7,012,503 B2 | 3/2006 | Nielson |
| (Continued) | | |

FOREIGN PATENT DOCUMENTS

| JP | 2007316949 A | 12/2007 |
| WO | WO 02/100040 A1 | 12/2002 |
| WO | WO 2006/136662 A1 | 12/2006 |

OTHER PUBLICATIONS

Bluetooth Special Interest Group, "Bluetooth Specification Version 2.1 + EDR [vol. 2]," Chapter 7 Secure Simple Pairing, *Bluetooth SIG, Inc.*, Jul. 26, 2007, pp. 888-906.
(Continued)

*Primary Examiner* — Jung Kim
*Assistant Examiner* — Ngoc D Nguyen
(74) *Attorney, Agent, or Firm* — Leydig, Voit & Mayer, Ltd.

(57) ABSTRACT

An encrypted security system and associated methods for controlling physical access. The system includes a security server configured to receive a request for authentication from a mobile device, the request comprising information identifying the mobile device and a physical access control device. The security server forwards an encryption message comprising a plurality of unique identifiers to the physical access control device via the mobile device. The physical access control device is configured to authenticate the plurality of unique identifiers in the encryption message and operate an access control mechanism.

14 Claims, 16 Drawing Sheets

Related U.S. Application Data

(60) Provisional application No. 61/355,303, filed on Jun. 16, 2010, provisional application No. 61/430,621, filed on Jan. 7, 2011, provisional application No. 61/518,240, filed on Apr. 25, 2011.

(51) Int. Cl.
 *H04W 12/08* (2009.01)
 *G06F 21/34* (2013.01)

(52) U.S. Cl.
 CPC ............ *H04L 63/10* (2013.01); *H04W 12/08* (2013.01); *G06F 21/34* (2013.01); *G07C 9/00309* (2013.01); *G07C 2009/00412* (2013.01); *G07C 2009/00769* (2013.01)

(56) References Cited

U.S. PATENT DOCUMENTS

| | | | |
|---|---|---|---|
| 7,873,989 | B2 | 1/2011 | Kärkäs et al. |
| 8,811,272 | B2 | 8/2014 | Stefan |
| 2002/0031228 | A1 | 3/2002 | Karkas et al. |
| 2002/0095588 | A1 | 7/2002 | Shigematsu et al. |
| 2005/0099262 | A1 | 5/2005 | Childress et al. |
| 2005/0216144 | A1 | 9/2005 | Baldassa |
| 2006/0143463 | A1 | 6/2006 | Ikeda et al. |
| 2007/0197261 | A1 | 8/2007 | Humbel |
| 2007/0300307 | A1 | 12/2007 | Duncan |
| 2008/0034422 | A1 | 2/2008 | Al-Azzawi |
| 2008/0076420 | A1* | 3/2008 | Khetawat ............... H04W 8/04 455/435.1 |
| 2008/0319665 | A1 | 12/2008 | Berkobin et al. |
| 2009/0176487 | A1 | 7/2009 | DeMarco |

OTHER PUBLICATIONS

International Searching Authority, International Search Report and Written Opinion relative to cognate International Patent Application No. PCT/US2011/040739, Sep. 5, 2011; 13 pp.

International Bureau of WIPO, International Preliminary Report on Patentability relative to cognate International Patent Application No. PCT/US2011/040739, Jan. 3, 2013, 9 pp.

lockitron.com, "Replace Your Keys with Your Phone," obtained from Internet site https://lockitron.com/learnmore on May 31, 2011, p. 1.

techcrunch.com, "Lockitron—Unlock Your Door with Your Phone," obtained from Internet site http://techcrunch.com/2011/05/13/lockitron-lets-you-unlock-yourdoor-with-your-phone/ on Aug. 29, 2011, 2 pp.

SIPO, Office Action in Chinese Patent Application No. 201180035733.3, Oct. 26, 2015, 23 pp.

* cited by examiner

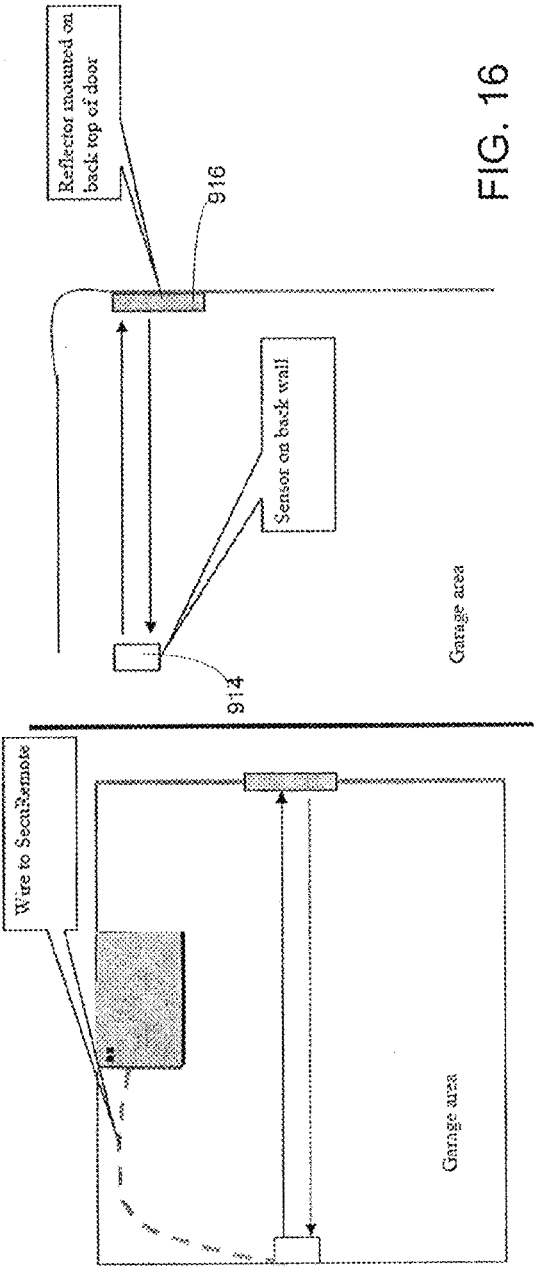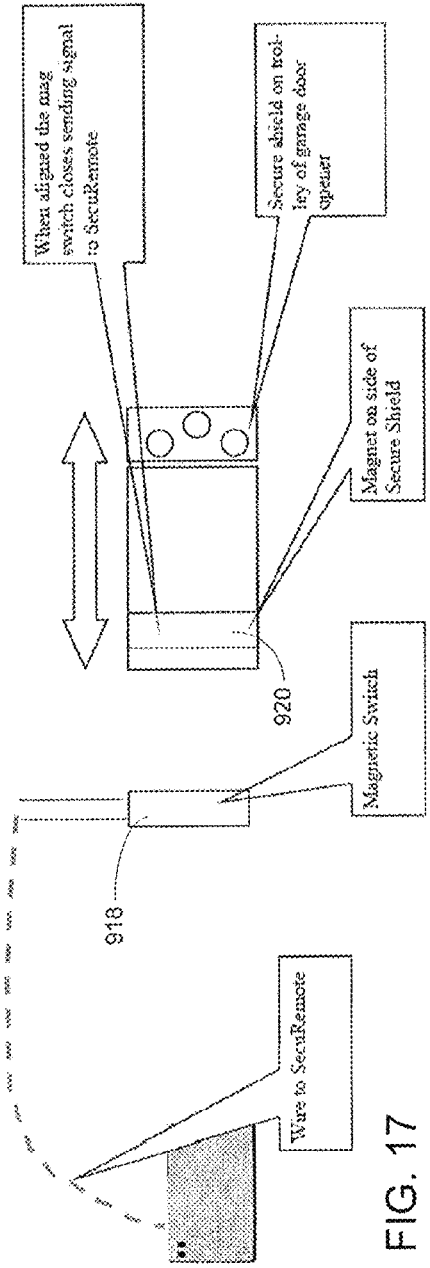

WIRELESS DEVICE ENABLED LOCKING SYSTEM

CROSS-REFERENCE TO RELATED APPLICATIONS

This patent application is a continuation of and claims priority of U.S. patent application Ser. No. 13/162,334, filed Jun. 16, 2011, entitled "Wireless Device Enabled Locking System," which in turn claims the benefit of U.S. Provisional Patent Application No. 61/355,303 filed Jun. 16, 2010, U.S. Provisional Patent Application No. 61/430,621 filed Jan. 7, 2011, and U.S. Provisional Patent Application No. 61/518, 240 filed Apr. 25, 2011, all of which are incorporated herein by reference in their entireties, including without limitation all drawings and figures therein.

FIELD OF THE INVENTION

This patent disclosure relates generally to lock devices and more particularly to a method and system for a wirelessly enabled locking device.

BACKGROUND OF THE INVENTION

Physical locks still serve an important function in commercial and consumer contexts today, ensuring that persons who are not entitled or authorized to access premises, products or materials are restricted from such access, while ensuring that those who require access do obtain it. In both commercial and consumer contexts, either an unauthorized access or an unintended refusal of access can have financial consequences, for example, and may cause delay and disruption. Thus, access management is important. However, full access management can be costly and time consuming, and is, sometimes, also inefficient to implement. Moreover, tracking access activities, while important, can be difficult and tedious with existing systems. Finally, electronic security considerations for access management systems are difficult to reliably implement.

It will be appreciated that this background description has been created by the inventor to aid the reader, and is not to be taken as a reference to prior art nor as an indication that any of the indicated problems were themselves appreciated in the art. While the described principles can, in some regards and embodiments, alleviate the problems inherent in other systems, it will be appreciated that the scope of the protected innovation is defined by the attached claims, and not by the ability of the claimed invention to solve any specific problem noted herein.

SUMMARY OF THE INVENTION

In one aspect of the invention, an encrypted security system for controlling physical access is provided. The system includes a security server configured to receive a request for authentication from a mobile device, the request comprising information identifying the mobile device and a physical access control device. The security server forwards an encryption message comprising a plurality of unique identifiers to the physical access control device via the mobile device. The physical access control device is configured to authenticate the plurality of unique identifiers in the encryption message and operate an access control mechanism.

In another aspect of the invention, a method of providing security in a wireless system for controlling physical access is provide. The method comprises receiving a request for authentication from a mobile device, the request comprising information identifying the mobile device and a physical access control device, in response to identifying the mobile device and the physical access control device, generating an encryption message comprising a plurality of unique identifiers, and forwarding the encryption message to the physical access control device so as to cause the physical access control device to authenticate the plurality of unique identifiers in the encryption message and perform an access control operation.

BRIEF DESCRIPTION OF THE DRAWINGS

While the appended claims set forth the features of the present invention with particularity, the invention and its advantages are best understood from the following detailed description taken in conjunction with the accompanying drawings, of which:

FIGS. 16-17 are schematic diagrams illustrating respective embodiments of a door status sensor for communicating a door open/close status signal to a user interface of a mobile device.

DETAILED DESCRIPTION OF THE INVENTION

The following examples further illustrate the invention but, of course, should not be construed as in any way limiting its scope.

Figure 1:
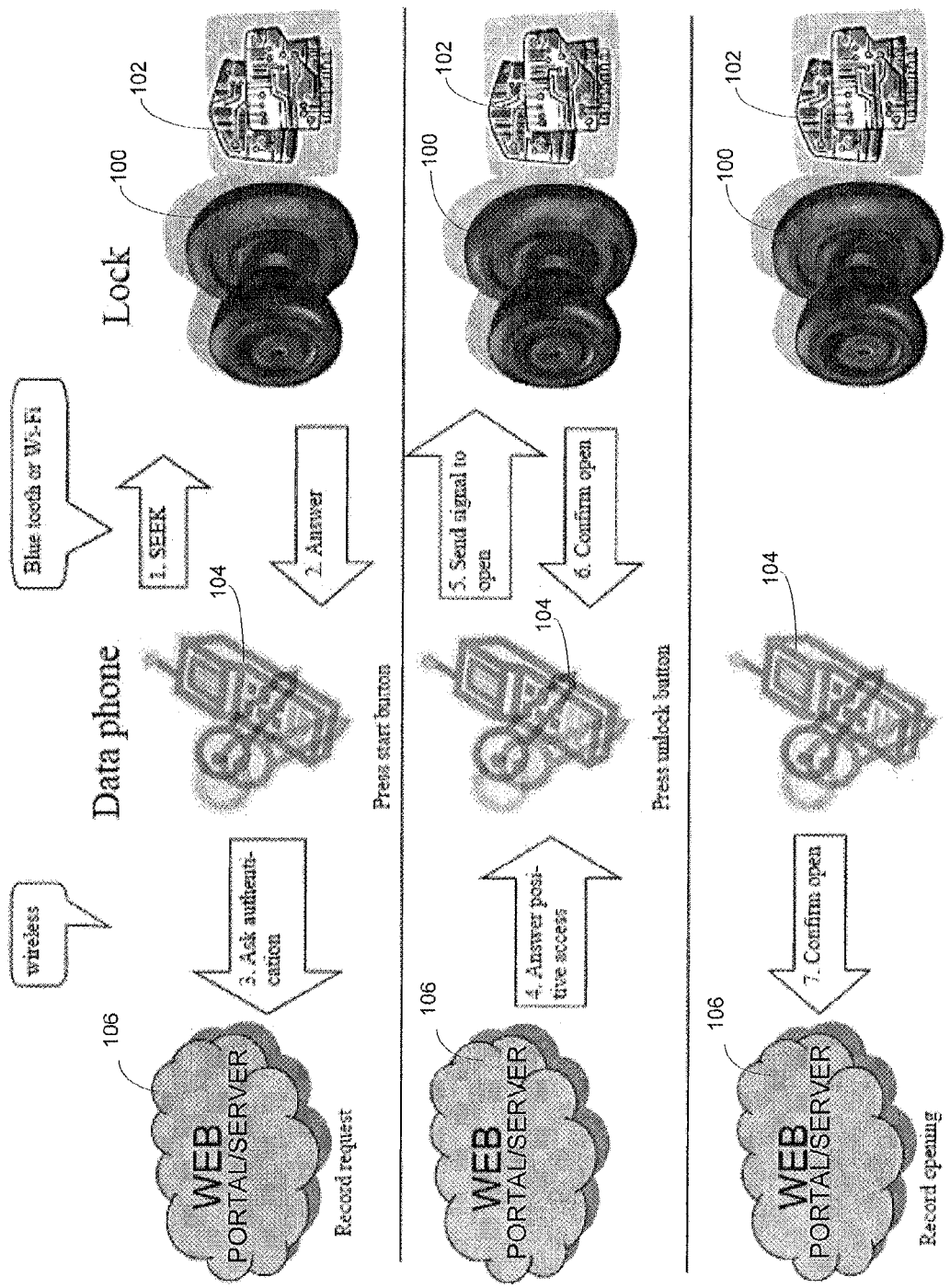
FIG. 1 is a schematic diagram showing an embodiment of the data flow and relationships in accordance with the disclosed principles.

Turning to FIG. 1, an embodiment of a system for wirelessly operating physical access devices, such as locks, is shown. The system includes an access device 100, such as a gate or a lock, including an entry door lock, a garage door lock, a safe lock, a drawer lock, a table lock, or the like. The lock 100 includes a communication and control module 102, which may be incorporated within or externally connected to the housing of the lock 100, configured to wirelessly communicate with a mobile device 104 in proximity of the lock 100. In the illustrated embodiment, the system further includes a Security Authentication Server (SAS), such as web server or portal 106, that includes non-transitory computer readable memory medium and a processor for storing and executing computer executable code comprising an encryption engine configured to process an authentication request from the mobile device 104 in connection with gaining control of the lock 100. As described in further detail below, when the mobile device 104 is in proximity of the lock 100, it establishes a wireless connection with the communication and control module 102, for example via a short-range wireless protocol, such as Bluetooth, Wi-Fi, Zigbee, Z-wave, or the like. In an embodiment, the mobile device 104 commences establishing a wireless connection with the lock 100 upon receiving user input from a user interface displayed on the mobile device 104 (e.g., when the user presses a start button via the user interface to establish a connection to a listed lock). In another embodiment, the mobile device 104 automatically establishes a wireless connection to communication and control module 102 of the lock 100 upon detecting its proximity, for example via automatic Bluetooth pairing when the lock 100 has been pre-configured in the lock database stored in the mobile device 104. Upon establishing contact with the lock 100, the mobile device 104 forwards an authentication request to the web portal 106 via a wide-area wireless access network capable of providing a data connection, including a connection to the Internet. In embodiments, the wide-area wireless access network operates in accordance with a wireless communication protocol, such as GSM, GPRS, EDGE, CDMA, CDMA 2000, Ev-Do, WI-MAX, UMTS, LTE, or the like. The processor of the web portal 106 executes computer readable code of an encryption engine that generates a series of patterns, such as shape patterns, and parameter parity checks for transmission to the communication and control module 102 of the lock 100 via the mobile device 104. When the communication and control module 102 of the lock 100 matches a predetermined shape pattern stored thereon to the shape pattern received from the web portal 106 and successfully executes a parameter parity check, it opens the lock 100 and sends a confirmation of the opening to the mobile device 104. The mobile device 104, in turn, relays the confirmation to the web portal 106 for logging the access event.

Figure 2:
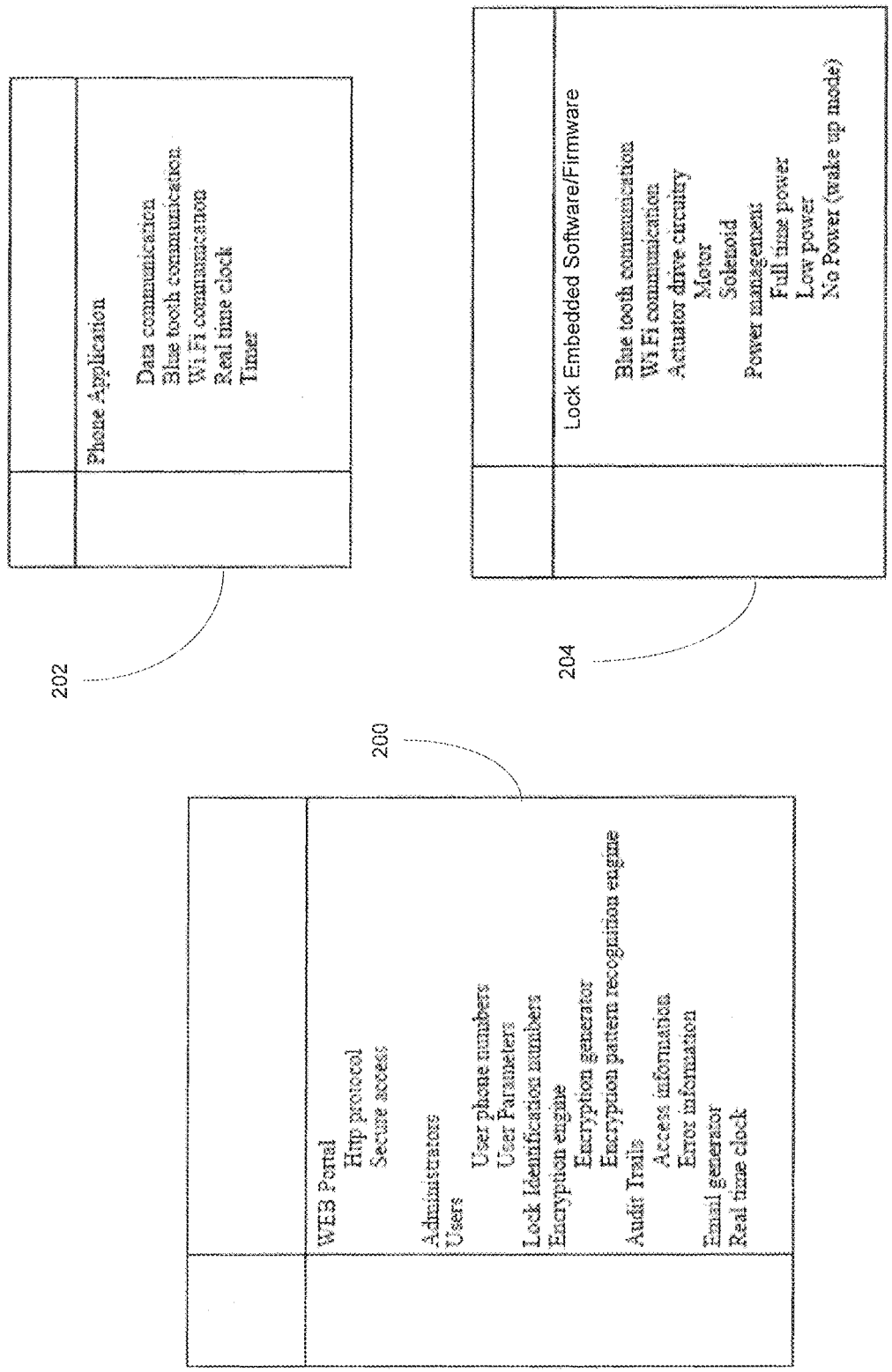
FIG. 2 is an architectural diagram showing aspects residing at three points of the system in accordance with an embodiment of the disclosed principles.

Turning to FIG. 2, an embodiment of data structures stored on respective non-transitory computer readable memory media of web portal/SAS 106, mobile device 104, and communication and control module 102 of the lock 100 is shown. Embodiments of the non-transitory computer readable memory of the foregoing hardware devices include flash, RAM, ROM, hard drive, and other types of non-transitory storage media. In the illustrated embodiment, the web portal 106 stores a data structure 200 including information regarding the following items: type of data protocol used to communicate with the mobile device (e.g., an HTTP protocol), an indicator that the communication is secured via the encryption engine, user parameters and phone number information, an administrator list, unique lock identification numbers, audit trail information, including access and error logs, email generator module (e.g., for forwarding email alerts and reports regarding access events to the administrator), as well as a real time clock for correlating with a mobile device authentication timer discussed below.

Figure 3:
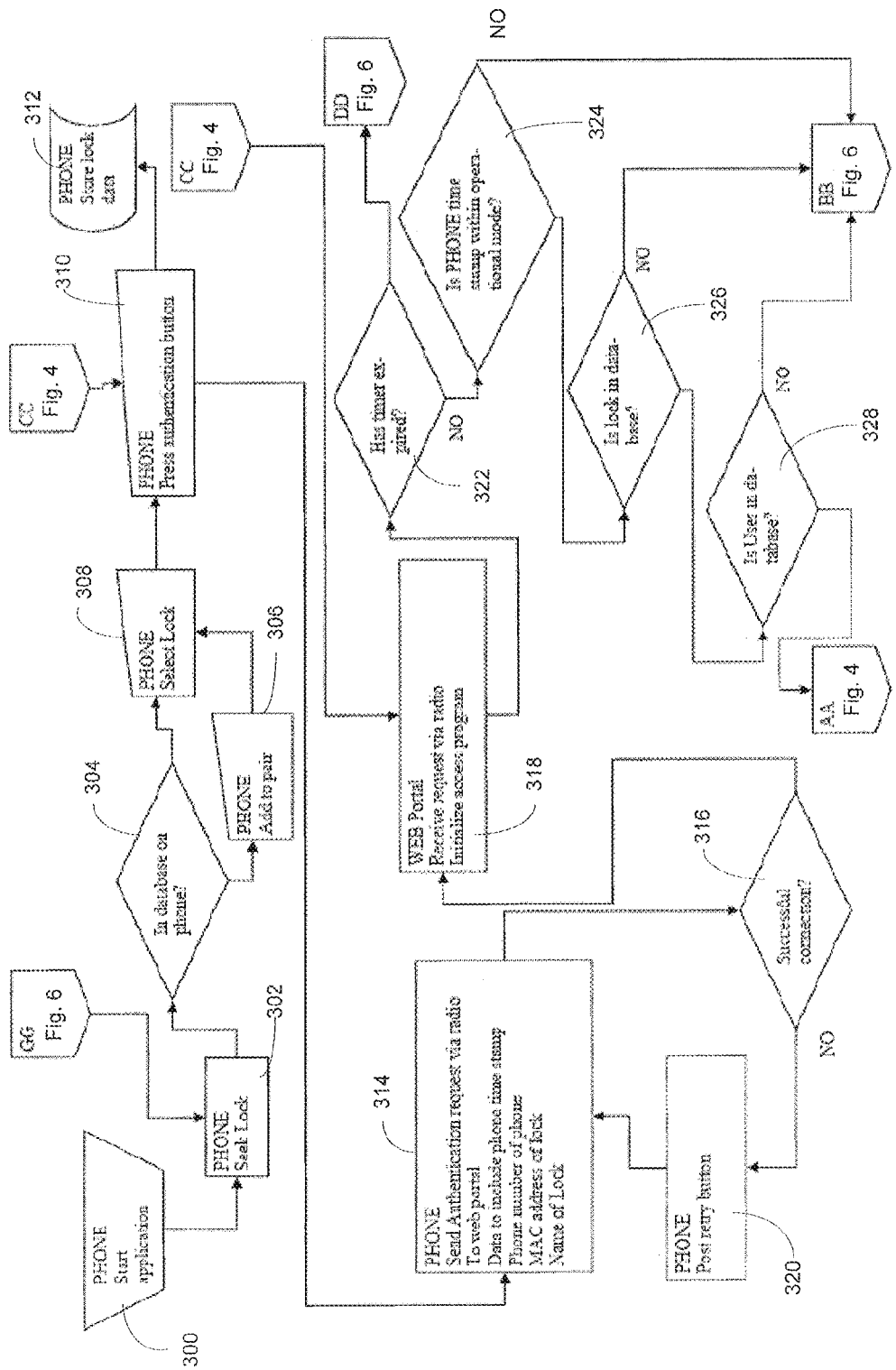
FIG. 3 is a flow chart illustrating a process flow in accordance with an embodiment of the disclosed principles.

Computer readable memory of the mobile device 104 stores executable instructions comprising an application 202 that provides the user interface for interacting with the lock 100 and further includes a real time clock and an authentication timer (FIG. 3). Additionally, embedded firmware 204 stored and executed via a processor associated with the communication and control module 102 of the lock 100 includes instructions for communicating with the mobile device via one or more short-range wireless protocols, as well as instructions for controlling actuator drive circuitry of the lock 100, such as motor and solenoid devices. The firmware 204 further includes executable instructions relating to lock power management, such as whether the lock is in full time power mode, low power mode, or whether the lock is in a sleep mode. For example, when the lock is connected to line power, it is in full power mode. If the lock is running on battery, then a low power mode is used with sleep mode being activated after a period of inactivity.

Turning to FIGS. 3-6, an embodiment of a method for providing security in a wireless system for operating access devices, is shown. Referring to FIG. 3, in steps 300-302, when the user launches a lock access application on the mobile device 104, a mobile device processor begins executing computer readable instructions comprising said application for interfacing with the lock 100 and web portal 106. In one embodiment, the application prompts the user to enter a Lock ID when the user launches the application. In an embodiment, the Lock ID is a string of alphanumeric characters, e.g., with a thirty two (32) character maximum, which are visible on the door. The Lock ID has a provision for customization of naming via the user interface of the mobile device 104. Upon identification of the desired Lock ID, the mobile device 104, such as a mobile phone, starts seeking whether the lock 100 is in proximity of the mobile device 104 so as to connect or pair with the lock. The lock 100 may alternatively or in addition transmit the Lock ID identifier as a Bluetooth identifier and/or a Wi-Fi device identifier. In embodiments, the phone 104 connects or pairs with the lock 100 without the need for displaying the Lock ID on the door and/or without initial user input of the Lock ID (e.g., based on displaying a list of available Lock IDs in proximity of the phone 104 for user selection). In steps 304-308, if the identifier of the lock 100 is pre-stored in the database of the phone 104, the phone 104 presents the user with an interface for selecting the lock 100 to access. Otherwise, the user is prompted to add the identifier of the lock 100 to the lock database stored in the phone 104 prior to selecting the lock 100 for access. Once the user selects the identifier of the lock 100, the phone 104 begins the authentication process with the lock 100, such as by displaying an authentication button, step 310. Alternatively, the authentication process begins upon user selection of the paired or connected lock without the need for further user input. The interface of the phone 100 may also allow the user to setup one or more Lock IDs to enable automatic connection and selection of one or more locks for authentication when the phone is in proximity of the lock(s). In step 312, lock data, such as new lock identifiers, is stored in the mobile device database.

Figure 6:
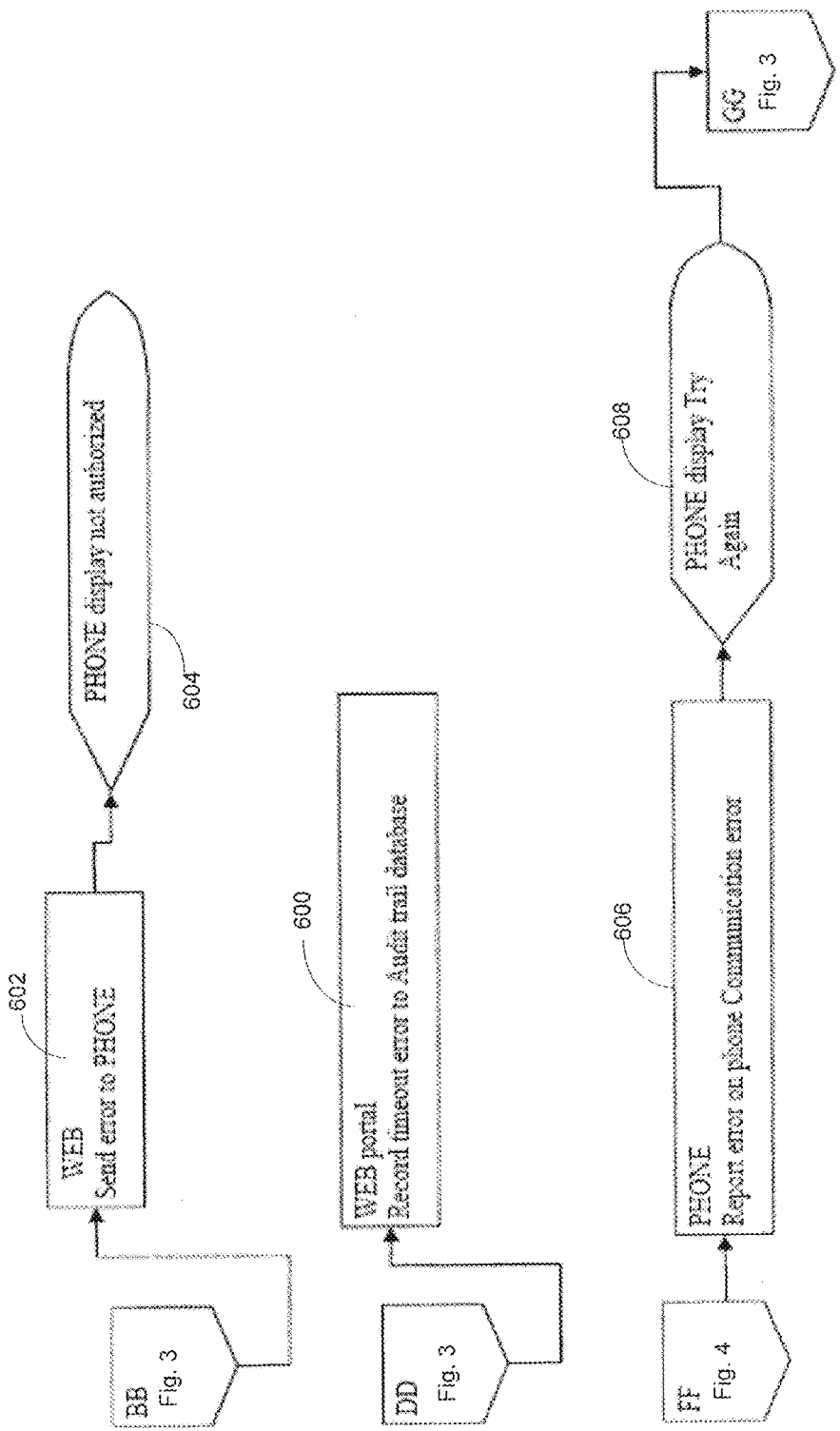
FIG. 6 is a flow chart illustrating a process flow in accordance with an embodiment of the disclosed principles.

In step 314, the application of the phone 104 communicates an authentication request via a wide-area access network to the web portal 106. The authentication request includes the unique identifier of the lock (i.e., Lock ID), telephone number of the phone 104, a unique phone identifier code that is retrieved from the phone by the application, a Media Access Control (MAC) address of the lock 100, as well as a time stamp. In an embodiment, the unique phone identifier is a serial number and/or an identifier generated by the phone application and stored in an encrypted manner in the phone. The authentication request is transmitted to the web portal/SAS 106 as a data message using an HTTP protocol with JavaScript Object Notation (JSON) for data serialization. If the data connection to the web portal 106 is successful (e.g., when an acknowledgement is received), the web portal 106 initializes execution of the access program code, steps 316-318. Otherwise, in step 320, the phone 104 retries the transmission of the authentication request message. In step 322, the web portal 106 checks whether an authentication timer has expired (the phone application receives the authentication timer from the web portal/server 106, where it was initiated according to user criteria, and maintains in memory to allow the lock to be operated within a specified time). If the timer expiration check is positive, then the processing continues to block DD of FIG. 6, where the web portal records a timeout error in an audit trail database (FIG. 6, step 600). Otherwise, the web portal 106 next checks whether the phone time stamp received via the authentication message is within the operational mode, step 324. If not, then the processing continues to block BB of FIG. 6, where the web portal sends an error message to the phone regarding lack of authorization (FIG. 6, steps 602-604). Otherwise, the web portal checks (step 326) whether the received lock information from the authentication message matches a lock in the web portal's database. If the lock information is not in the web portal's database, the processing returns to block BB of FIG. 6 (discussed above). However if the received lock information matches a lock in the web portal's database, the web portal next performs a similar check with respect to identifying a registered user based on the user-related information in the authentication message (e.g., based on the phone number), step 328. If the user is registered in the web portal's database, the processing continues to block AA of FIG. 4. If the user is not in the web portal's database, the processing loops back to block BB of FIG. 6.

Figure 4:
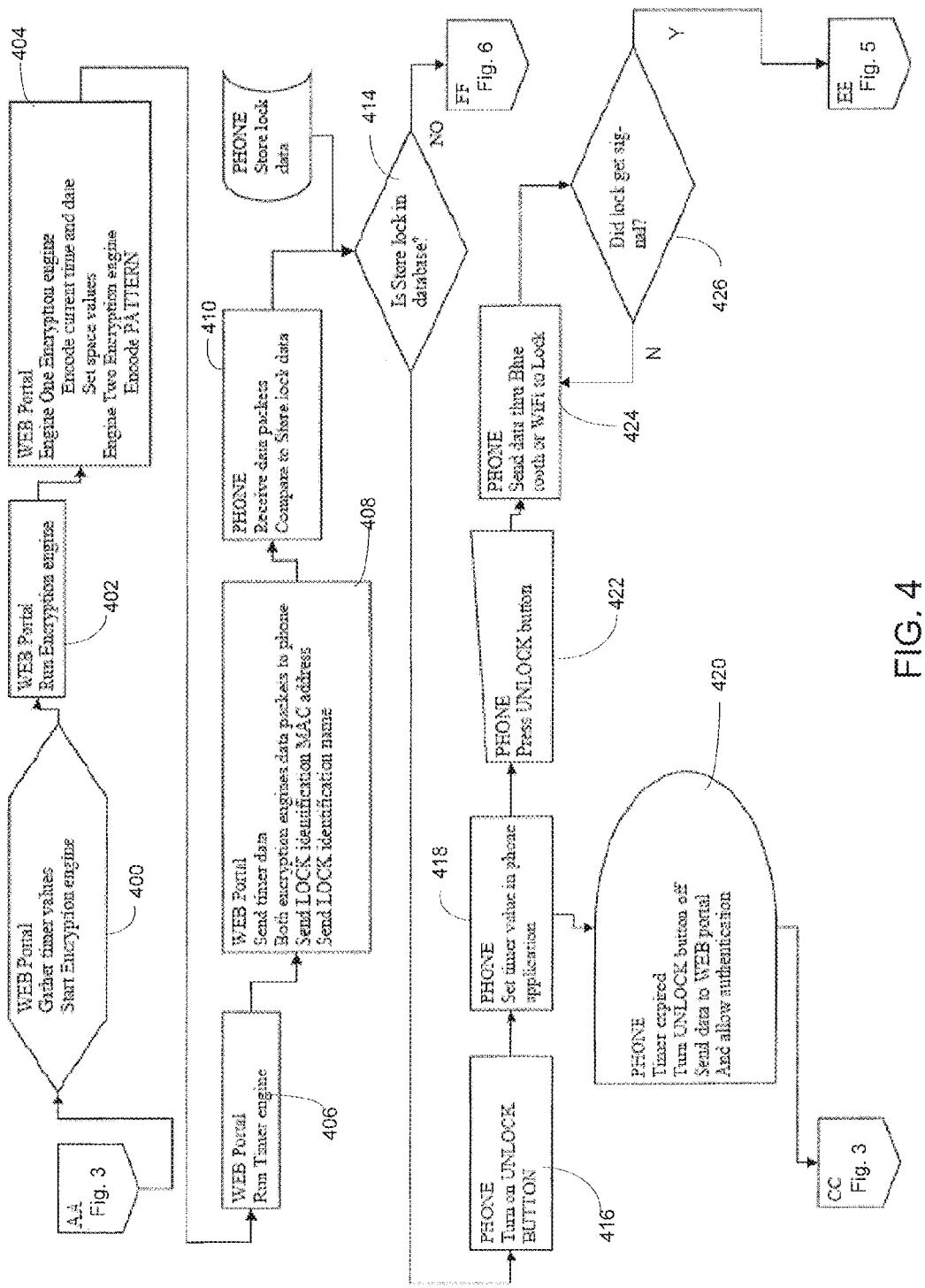
FIG. 4 is a flow chart illustrating a process flow in accordance with an embodiment of the disclosed principles.

Referring to FIG. 4, when the web portal 106 determines that the user is in its database of registered users (from step 328 in FIG. 3), the web portal 106 gathers the timer values and starts executing computer readable code stored therein comprising an encryption engine, steps 400-402. In general, upon request from the phone application, the web portal/SAS 106 will generate a Public Key and use this to generate an Encryption Key. The web portal 106 then sends both the Public Key and the Encryption Key to the application. Provided the application receives authorization from the web portal 106, the application then encrypts an "UNLOCK" message via the Encryption Key and sends the message to the lock 100 in the door. The lock 100 then decrypts the message using the same algorithm and operates the lock motor into the desired position (e.g., an "UNLOCK" position). Specifically, referring again to FIG. 4, in step 404 the encryption engine of the web portal 106 encodes the current time/date and sets space values (e.g., serial number and command, such as open or close command, via a first encryption engine module), as well as encodes a pattern for subsequent transmission to the lock 100 (e.g., via a second encryption engine module), as further described in FIG. 7 below. In steps 406-408, the web portal runs the time engine and sends the following data to the phone 104: timer data, data encrypted by both encryption engine modules discussed in step 404, as well as sends lock identification MAC address and name. In steps 410-412, the phone 104 receives the above information from the web portal and compares the received information to the stored lock identification data (e.g., lock name and MAC address). If the received lock identification data is in the phone's database, the phone activates an "UNLOCK" button at its user interface and sets a timer value in the phone application, steps 414-418. In the event the received lock identification data is not in the phone's database, the processing continues at block FF of FIG. 6 where the phone displays a communication error and prompts the user to try again (FIG. 6, steps 606-608). In step 420, if the authentication timer has expired the phone deactivates the "UNLOCK" button at the user interface. The phone also transmits the timer value to the web portal and the process continues at block CC of FIG. 3. In step 422, if the timer value has not yet expired, the phone 104 presents the user with a menu to press the "UNLOCK" button. If the timer has expired, then the user may imitate another unlock request. In step 424, the phone 104 sends the data received in step 408 from the web portal 106 to the lock 100 (e.g., via a short-range wireless connection such as Bluetooth, Wi-Fi, Zigbee, and/or Z-wave, or the like). In step 426, if the lock 100 has not received the transmission from the phone 104, the transmission is retried. Otherwise, the lock 100 begins its authentication process at block EE of FIG. 5.

Figure 5:
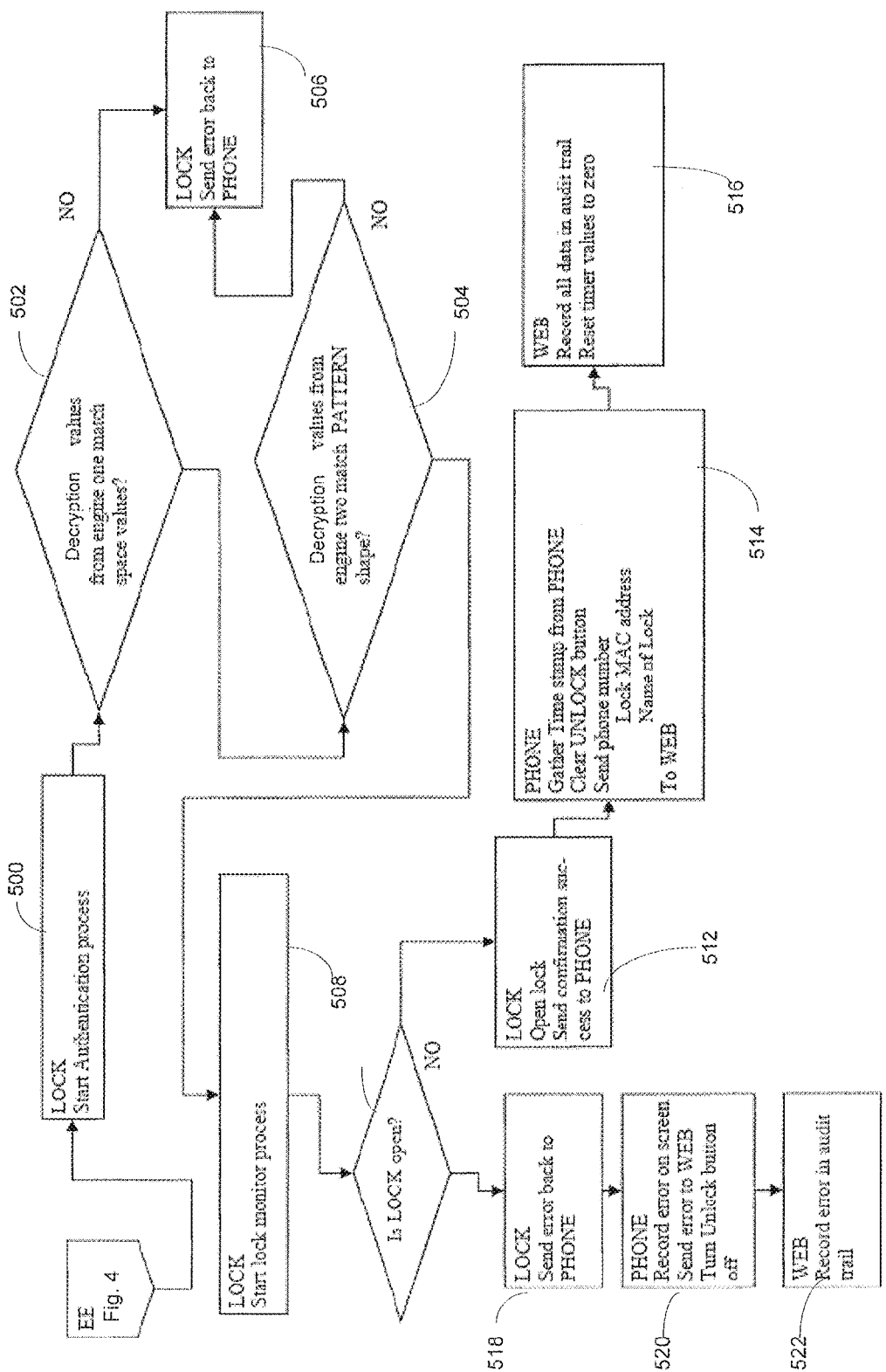
FIG. 5 is a flow chart illustrating a process flow in accordance with an embodiment of the disclosed principles.

Referring to FIG. 5, in steps 500-502, the lock 100 begins its own authentication process by executing an encryption engine that checks whether the space values of the first encryption module, which are received from the web portal 106 (see FIG. 4, step 404) via the phone 100, match the serial number and command stored in the lock. In step 504, the encryption engine of the lock 100 performs a check whether the pattern shapes of the second encryption module, which are received from the web portal 106 (see FIG. 4, step 404) via the phone 100, match the pattern shapes stored in the lock. If either the lock space values or the pattern shapes stored in the lock do not match those received from the web portal 106, the lock sends an error to the phone for notifying the user, step 506. If both space values and pattern shapes received from the web portal match those stored in the lock, the lock in steps 506-508 checks whether the lock is already open. If the lock is not in the open state, then the lock opening mechanism is actuated to open the lock and a confirmation is sent to the phone, step 510. In step 512, the phone creates a time stamp, clears the "Unlock" button at the user interface, and sends the phone number, lock name, and lock MAC address to the web portal for recording. In step 514, the web portal records the lock open event data in the audit trail and resets the authentication timer to zero.

When the lock was already in the open state, in steps 516-518, the lock sends an error back to the phone, which displays it via the user interface and forwards it to the web portal. Consequently, in step 518, the phone deactivates the "Unlock" button. Finally, in step 520, the web portal records the error in the audit trail.

Figure 7:
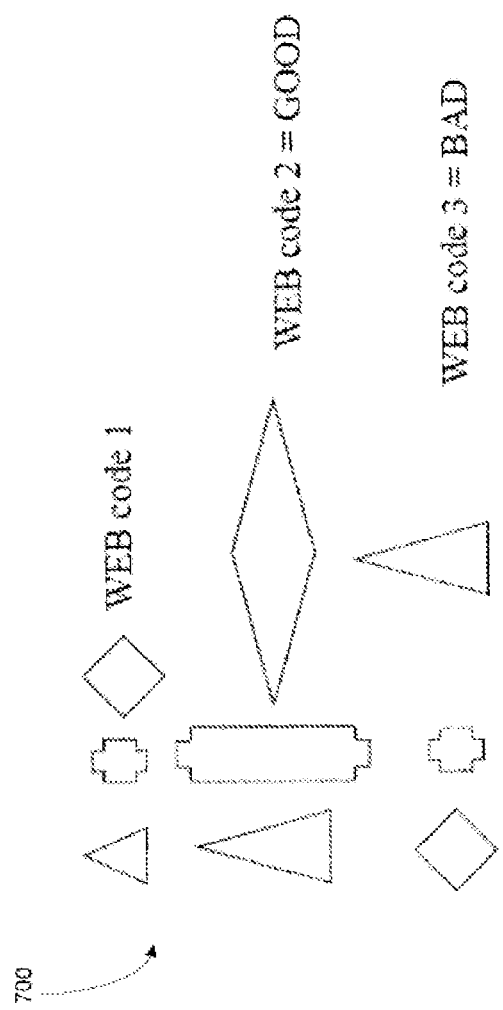
FIG. 7 is an encryption pattern and space value definition diagram in accordance with an embodiment of the disclosed principles.

Turning to FIG. 7, an embodiment of encryption pattern and space definitions employed by the web portal 106 and lock 100 is shown. The web portal's encryption engine generates a series of patterns, for instance a plurality of distinct geometric shape patterns 700 shown in FIG. 7. Each geometric shape is represented as a numeric function. For example, a triangle is represented as a sequence of numbers, such as "1004535"). Alternatively or in addition Secure Socket Layer (SSL) Advanced Encryption Standard (AES) message encryption is employed. In one embodiment, the geometric patterns 700 are assigned a predetermined order. As discussed above in connection with FIGS. 4-5, the lock 100 receives the shape patterns 700 from the web portal 106, via the phone 104, and compares the received encryption pattern shapes to those previously stored therein. Preferably, the encryption engine of the lock 100 matches the relative shape of the received patterns. In an alternative embodiment, the shape size is also encoded into the transmitted pattern data. Alternatively or in addition, as part of the authentication process executed by the encryption engine of the lock, a comparison of the assigned order indicators of the received patterns to the order indicators of the matching patterns in the lock's memory is made. With respect to the space values encryption, in an embodiment, it entails a parity check on the length of the data packet sent from the web portal to the lock, as well as a check on the values of received parameters being within the predetermined "normal" ranges (e.g., a time stamp value of "99" hours is outside of the predetermined "normal" range). In an embodiment, the lock encryption engine is seeking a series of patterns that matches the shape, not the relative size. There are over one-hundred shapes being exchanged in each data transmission and these patterns change size each time. In the example shown in FIG. 7, the lock looks for, in order: triangle, cross, diamond.

Figure 8:
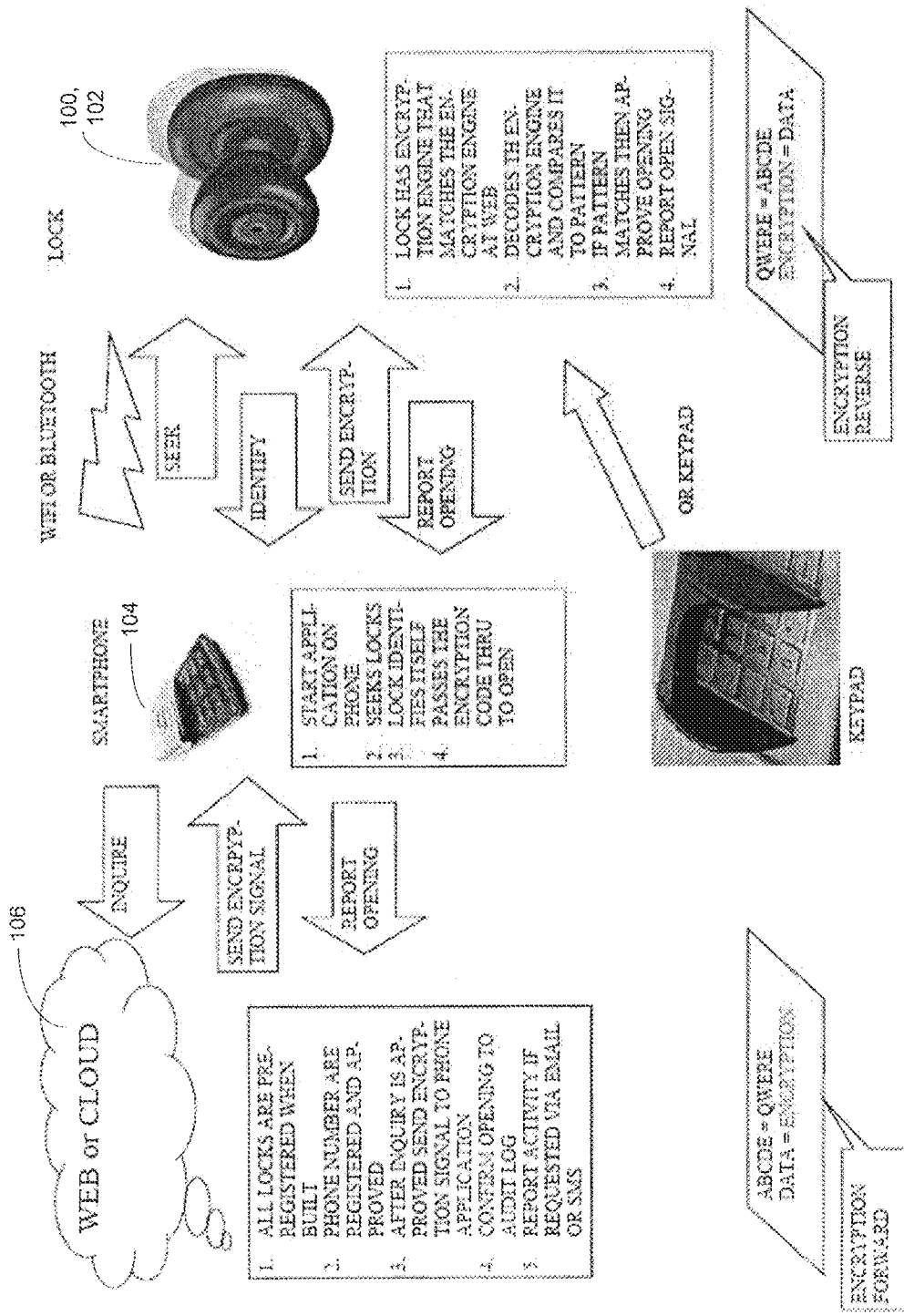
FIG. 8 is an architectural overview showing data flow and activities in accordance with an embodiment of the disclosed principles.

Turning to FIG. 8, an embodiment of system components and associated functionality is shown. The lock 100 is preregistered at the web portal 106 when built (e.g., during or prior to installation). Additionally, the web portal 106 includes a database of approved phone numbers. During authentication, the web portal 106 sends an encryption message, discussed above, to the phone application for interacting with the lock 100. The web portal 106 confirms access events and records them in an audit log and is capable of reporting the logged activity via email or SMS if requested. An application executing on the mobile device, such as a smart phone 104, communicates with a lock 100 in its vicinity and passes the encryption message to the lock. The lock 100, in turn, includes a processor executing computer readable instructions stored in memory of the lock. Specifically, the lock 100 includes an encryption engine that decodes the message received from the web portal 106, including comparing the received pattern to that stored in the memory of the lock. When the pattern match occurs, the lock 100 activates the opening mechanism and reports the open event to the web portal 106 via the phone 104. In an embodiment the lock opening mechanism comprises a lock cam that rotates ninety degrees from unlocked to locked position and vice versa. In embodiment, the lock 100 is powered by batteries. Alternatively, the lock 100 may be powered by line voltage.

Figure 9:
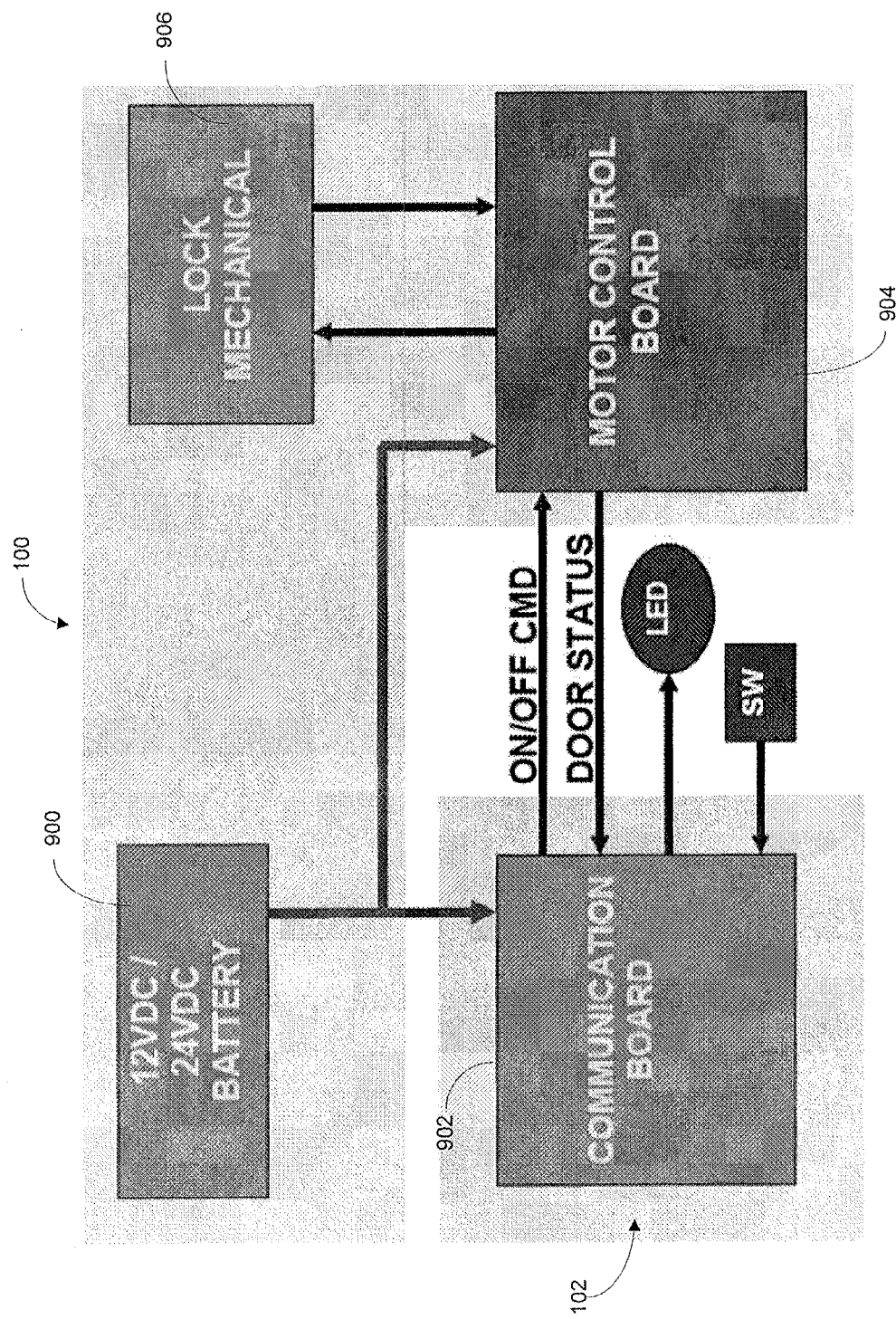
FIG. 9 is a schematic overview of the components of the lock assembly in accordance with an embodiment of the disclosed principles.

Turning to FIG. 9, an embodiment of the hardware components of the wireless lock 100 is shown. The lock 100 includes a battery 900 for providing electrical power to a communication board 902 and motor control board 904 of the communication and control module 102 (FIG. 1). The communication board 902 includes a short range transceiver for communicating with the phone 104, as well as a processor and computer readable memory that stores executable instructions comprising the lock encryption engine described above. The communication board 902 relays on/off (open/close) commands to the motor control board 904, which controls the mechanical lock opening mechanism 906. Embodiments of the lock opening mechanism 906 include but not limited to a mortise lock, a dead bolt, a buzzer operated lock, a garage opening mechanism, among others.

Figure 10:
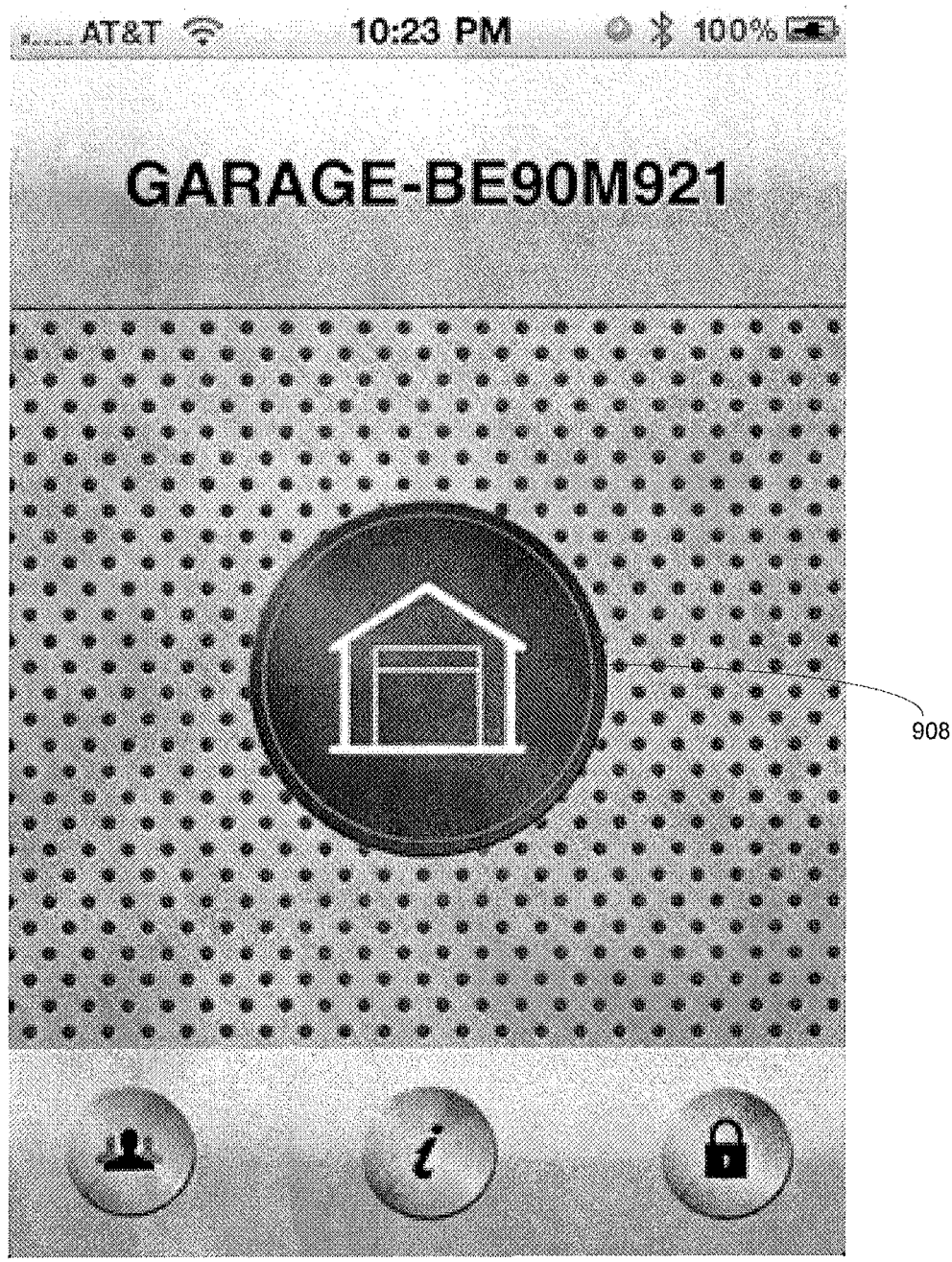
FIG. 10 is a diagram illustrating an embodiment of a user interface screen for graphically displaying the status of a physical access control device.

Referring to FIG. 10, an embodiment of a user interface screen of the phone 104 graphically displaying the status of the lock 100 is shown. In the illustrated embodiment, an icon 908 is color-coded to represent the open or locked status of the lock 100. For instance, when the icon 908 is red, the lock is closed. When the icon 908 is blue, the lock is open. This allows the user to determine, upon wirelessly connecting to the lock 100 whether the a lock open request needs to be initiated via the user interface of the phone 104 without physically interacting with the lock (e.g., while being inside a car or while being inside a house when the foregoing system is installed to operate a garage or another remote door for example). Alternatively or in addition, the graphical representation and/or animation of the icon 908 may change with the change in the open status.

Figure 11:
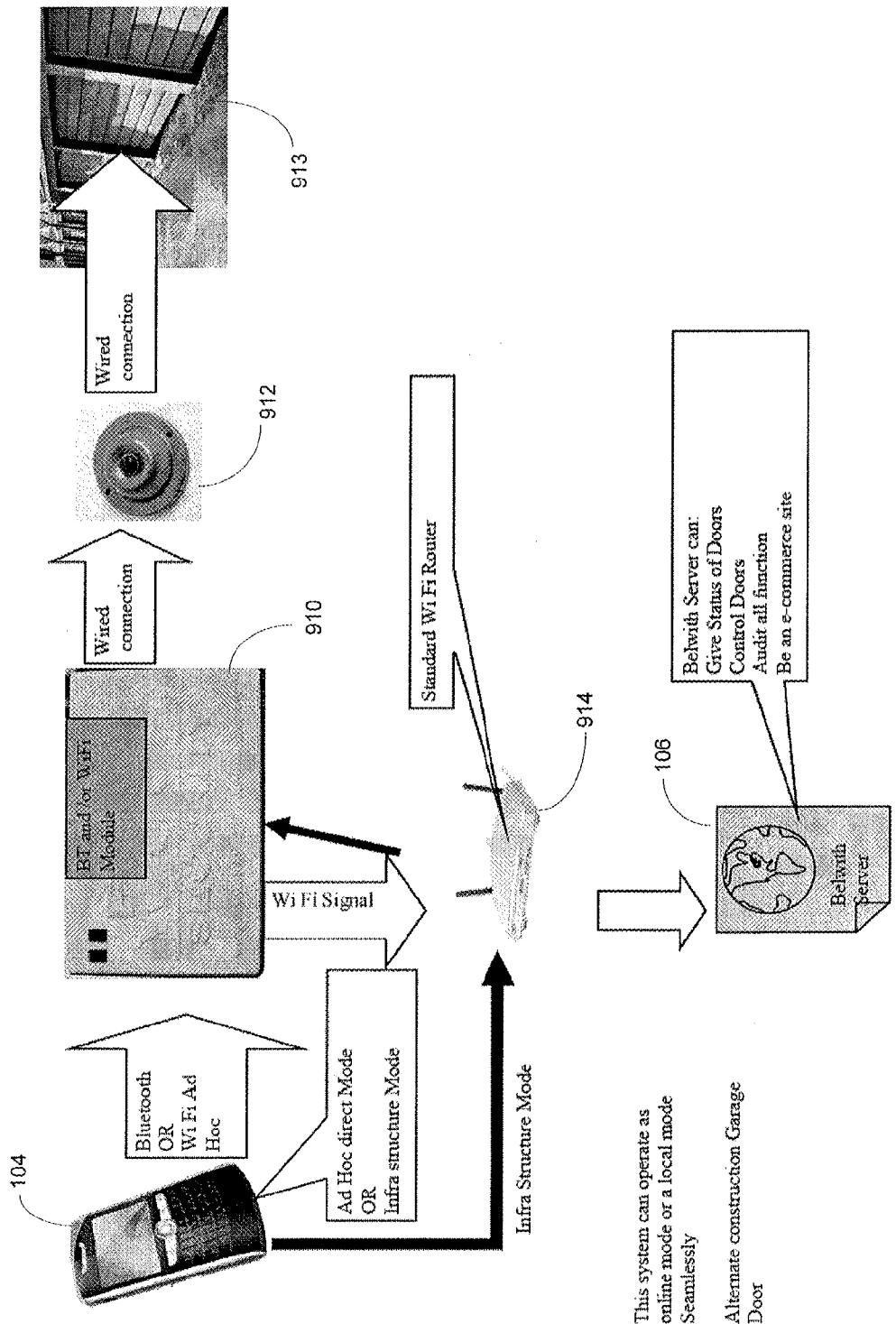
FIGS. 11-15 are schematic diagrams illustrating respective embodiments of a wireless device enabled locking system.
Figure 12:
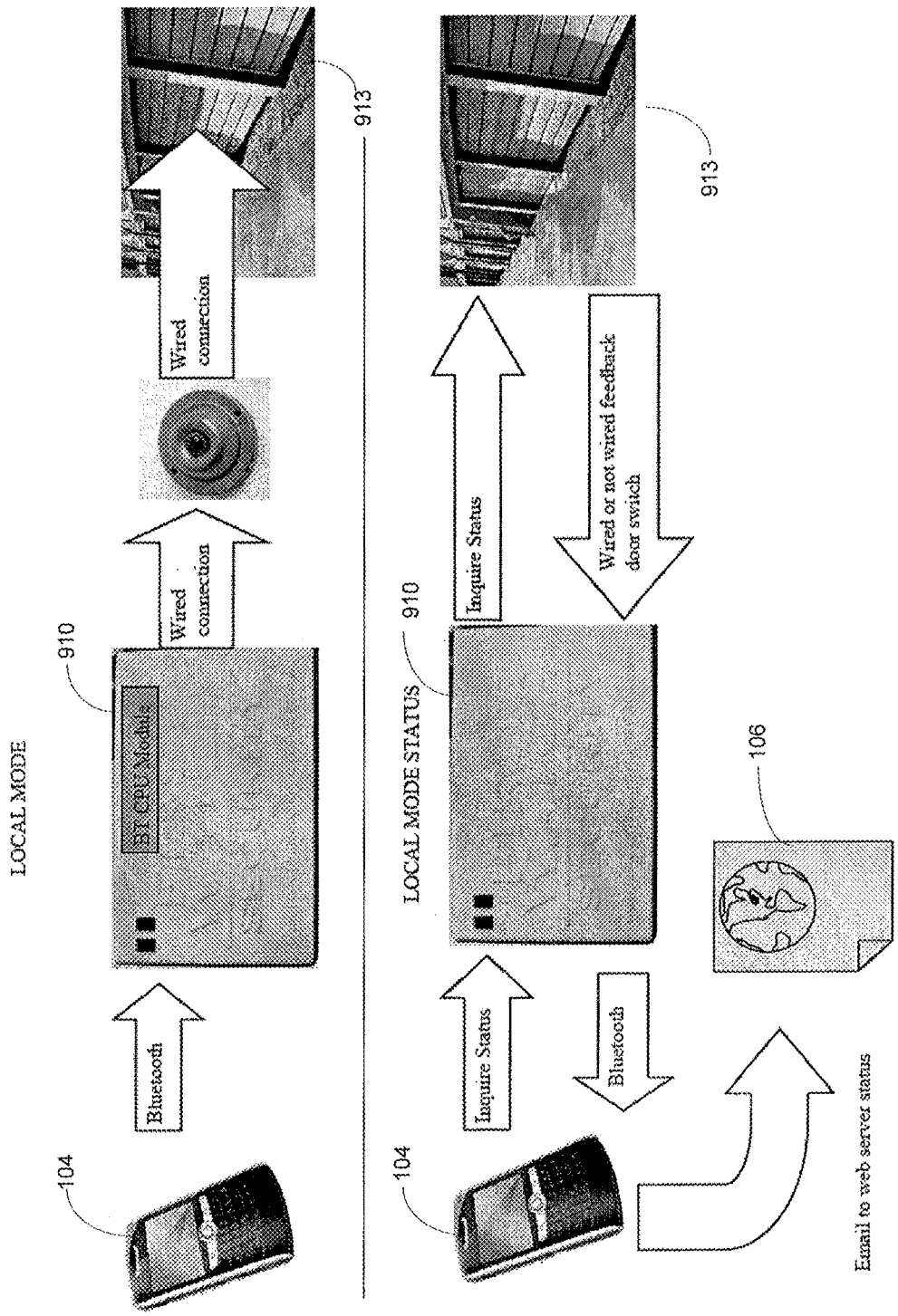
Figure 13:
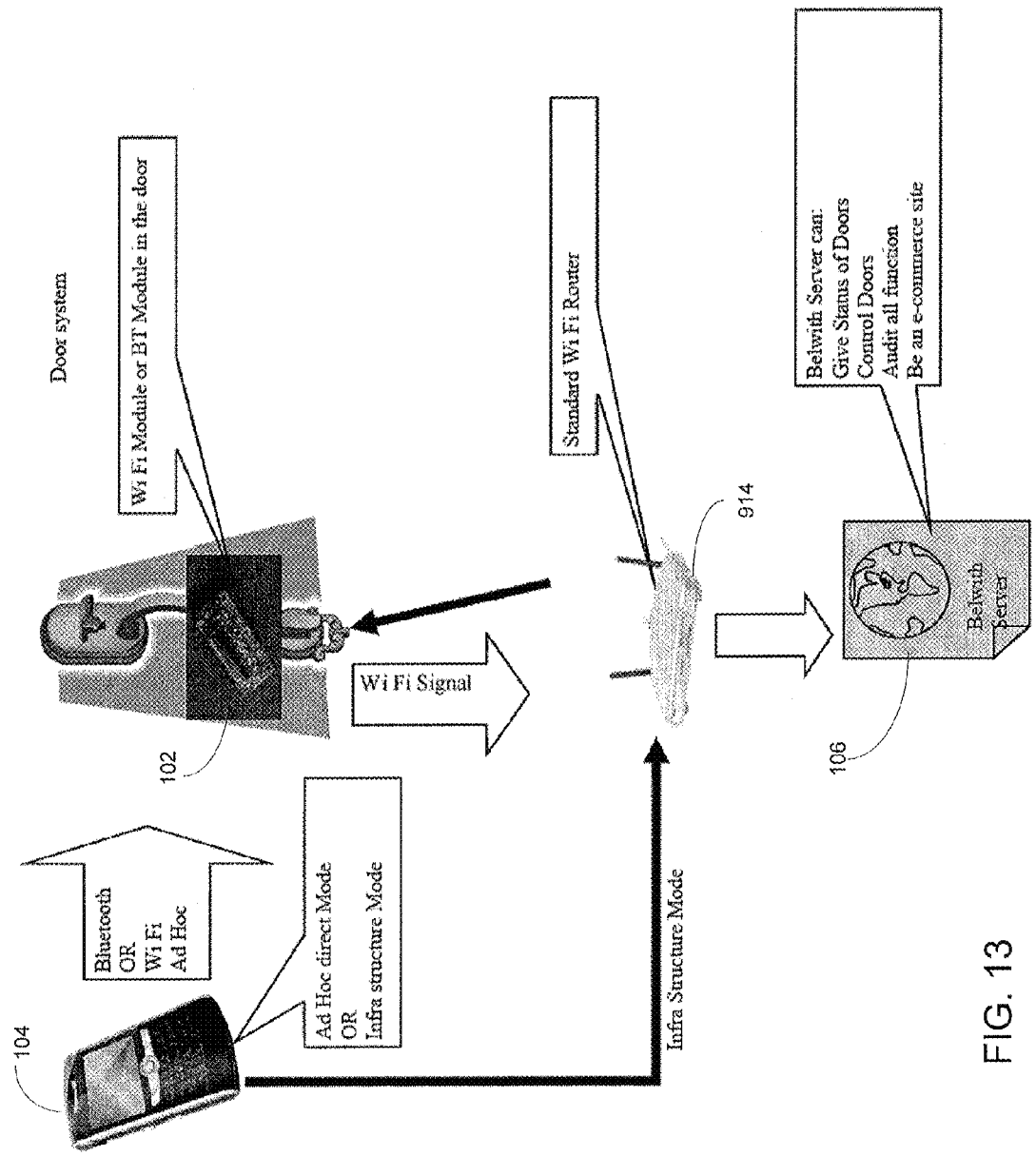

Referring to FIGS. 11-13, alternate embodiments of the wireless locking system described above are shown. For instance, in FIGS. 11-12, an embodiment of the system in accordance with the invention is shown in connection with operating a garage door 913. In the illustrated embodiment, the system operates in two modes. An Online mode (FIG. 11) allows cloud/Internet based communication between the communication device 104 and garage door opener transceiver module 910 (connected to the garage door switch 912 actuating existing garage door equipment) utilizing the encryption scheme via the web portal 106 as described above in connection with FIGS. 1-8. In an embodiment, the mobile device 104 and the garage door opener transceiver module 910 are interconnected via Bluetooth and/or Wi-Fi, where a system further includes a Wi-Fi Router 914 for relaying the authentication signaling to the web portal 106 (e.g., as an alternative for the mobile device 104 communicating with the web portal 106 via a wide area wireless network). The other mode is called Local (FIG. 12) and relies on a short-range personal network (e.g., via encrypted Bluetooth) communication between said devices. Preferably, the communication device 104 can use either mode, such as when all users of multiple mobile devices having access to the system are assigned the same mode or when a subset of users is assigned a Local or alternately an Online user status. The Online and Local device and/or user statuses can be intermixed in the same personal network. In an embodiment, the mobile device 104 presents the user with a door open/close status interface screen, such as that shown in FIG. 10 above. FIG. 13 shows an alternate embodiment of FIG. 11 where a communication and control module 102 controls a regular door lock and the system employs a Wi-Fi router 914 for relaying the authentication messaging described above in connection with FIGS. 1-8 to the web portal 106.

Figure 14:
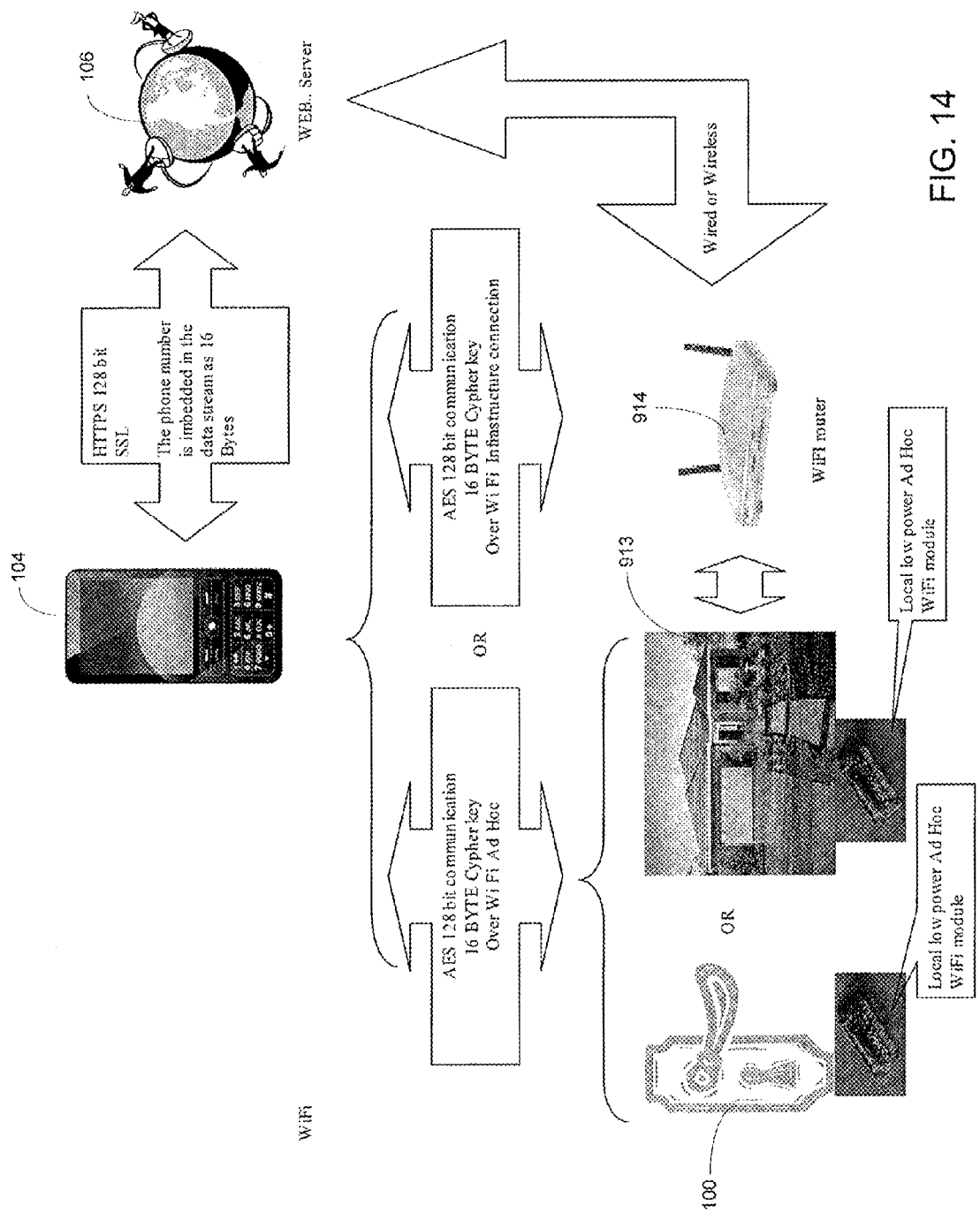
Figure 15:
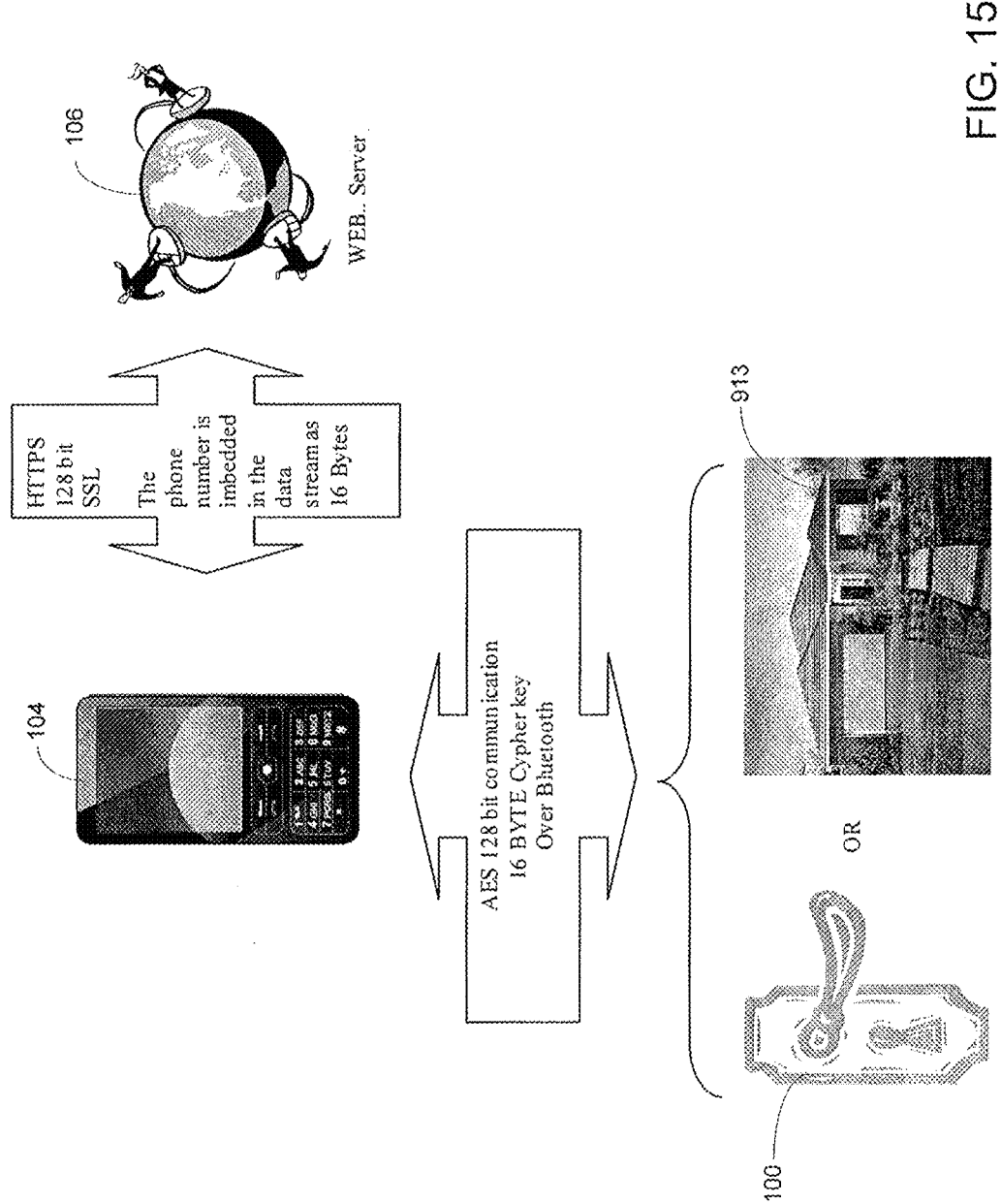

FIGS. 14-15 illustrate an embodiment of an implementation of the wireless access system of FIGS. 1-13 above where the mobile device or phone 104 communicates with the web portal 106 via HTTPS protocol using 128 bit SSL message security. The mobile device's phone number is embedded in the data stream utilizing 16 bytes. As shown in FIG. 14, in case of Wi-Fi communication between the mobile device 104 and lock 100 and/or garage door 913, the Wi-Fi messaging is encrypted via AES 128 bit encryption with 16 byte cipher key over Ad Hoc or Infrastructure Wi-Fi communication mode. In FIG. 15, in case of Bluetooth communication between the lock 100 and/or garage door 913 AES 128 bit message encryption with 16 byte cipher key may likewise be used.

FIGS. 16-17 illustrate embodiments of a door status sensor for sending a door open/close status signal to the user interface of the mobile device 104. In FIG. 14, an infrared, optical, or a similar type of wireless sensor (e.g., an optical sensor/reflector pair 914, 916) is used to detect the door status, such as the status of a garage door. In FIG. 15, a magnetic sensor 918, 920 is used to detect door closure when the magnetic switch 918 is aligned with the magnet 920 on the door.

Overview of Features of Embodiments of the Invention

As seen in the foregoing Figures, the invention eliminates the potential for breach in managing many locations across a mobile workforce. It provides an unparalleled level of secured access with simplified management using mobile devices, such as smart phones, tablets, and the like, as remote keys, as well as provides full audit trails and secure data transmission. In particular, the mobile device, such as a phone, contains no security data, and no encryption tables. The phone communicates to the lock through secured Bluetooth and/or Wi-Fi or the like data lines and allows administrator control from any web terminal using a form of SSL security.

In various embodiments, the lock can be configured to operate doors of many types. The phone is used as a communication device (e.g., receives encryption data and converts to Bluetooth and sends signal to lock) and, in embodiments, there are no external routers, computers, or additional Z-wave boxes required. The system operates in peer-to-peer or Ad Hoc modes.

The phone application can run on any suitable platform including, e.g., I-PHONE (iOS), BLACKBERRY, ANDROID, or other mobile operating systems.

Embodiments of the lock components include the following: 1. Latch assembly, motor (actuator), communication board & associated custom driving linkages (Lock); 2. Wire harness; 3. Mounting Hardware; 4. Battery (optional); 5. External battery pack (optional).

Power Requirements:
1. 5 to 24 volts DC;
2. Current draw 2 AMP max;
3. Current usage in sleep mode less than 100 mA;
4. Can be powered with batteries or external battery pack;
5. Over current protection on all circuitry.

Mechanical Features: (Customizable for Specific Applications):
1. Three point anti pry locking system;
2. Two point compression locking to provide seal on door;
3. The Lock occupies the same or less space in the cabinet than the existing mechanical system;
4. Permanent magnet motor drive (alternately solenoid actuator);
5. In-field upgradeable from current mechanical lock to electrical Lock system;
6. Operating temperature from +120 degrees to −30 degrees;
7. Automatic locking feature upon door closing (optional).

Electronic Features:
1. Bluetooth/WiFi communication;
2. Encrypted solid state memory;
3. Peer to Peer (ad-hoc);
4. No attack point;
5. Encrypted access codes;
6. Web based audit;
7. Wireless in-field upgrades available via flash memory;
8. All circuitry is protected from over current, power spikes and power loss recovery.

Access

Unlocking the ISS Lock is performed via data enabled cell phones enabled with wireless applications (Bluetooth or WiFi), coupled with the server solution described herein.

Workflow Overview

The Mobile Security Authentication System consists of the Smartphone Application, our Security Authentication Server (SAS), and the ISS Lock. The system uses an algorithm for random number generation, e.g., a Public Key. The Public key, along with an encryption algorithm, is used to generate the Encryption Key, and return authenticated codes to the application on the phone. The encryption algorithm resides on both the ISS Lock, as well as the Security Authentication System Server, which is a hosted web based platform.

Workflow Specifics

The application prompts the user to enter a LOCK ID when the user launches the application. In an embodiment, the LOCK ID is a string of alpha numeric characters with 32 character max visible on the door. The Lock ID has provision for customization of naming. The application then sends the LOCK ID, Phone Number, and unique phone identifier code (which is retrieved from the phone by the application) as a data message using the cellular network, to the SAS using HTTP protocol with JSON for data serialization. Upon request from the application, the SAS will generate the Public Key and use this to generate the Encryption Key. The SAS then sends both the Public Key and the Encryption Key to the application. Provided the application receives authorization from the SAS, the application will encrypt an "UNLOCK" message via the Encryption Key, and send the message to the ISS Lock in the door. The ISS Lock then decrypts the message using the same algorithm, and operates the lock motor into the "UNLOCK" position.

Smartphone Application

As noted above, the mobile device application may run on any suitable platform, including those BLACKBERRY, ANDROID, and IPHONE (iOS) mobile operating systems.

Security Authentication Server (SAS) Overview

The SAS is a web based platform accessible by clients through a browser. It is a central administration area where clients manage access to all the ISS Locks they own. It is a self serve portal for clients. Clients sign into the secure portal for the purpose of maintaining Lock ID/Phone number combinations, time of day access permissions, activation and de-activation of certain phones or Lock IDs.

Mobile Application User Interface

When user launches application on mobile device, user identifies which lock they want to have access to and then clicks an "Authenticate" button to send Unlock Request message to selected URL.

Unlock Request/Status Message

Unlock request message is send from mobile application to the web portal using HTTP post. The web portal/server authenticates user's request for unlock operation using Lock ID and Phone number information received from this message. The web portal confirms the mobile application is allowed to operate within the requested time limitation set by the Administrator and then sends an Unlock Status message to the mobile application. The Web Server indicates status of this request in an access log.

Mobile application sends Unlock Request/Status message in a following format using HTTP Post:
Type: 1 Character
1 ANDROID
2 IPHONE (iOS)
3 BLACKBERRY
(IPHONE/IPOD also sends a UDID information to uniquely identify device using this field to specify type of Mobile where application is running)
Phone #: 11 Characters (Phone Number)
Lock ID: 16 Characters (Lock ID)
Action: 1 Character:
1 Request (Authentication Request)
2 Status (Status of the request)

Status: 1 Character (Only Consider if Action is 2):
0 Success
1 Fail (Hardware Issue)
2 Timer Expire (User has not requested unlock operation in given time interval)
3 Invalid message (Message is not correct once decrypted)
4 Cannot communicate to Hardware device
5 Invalid date (Date information received is not matching with encrypted message received)
6 Duplicate Random Number (Received Random Number in a message already used for a given date)

Status code 5 and 6 are to avoid unlock operation from unauthorized source. If mobile has no connectivity to web server when status code received from Hardware device, mobile will send this status code as a part of next Authentication UNLOCK request message to web server. Web server needs to retrieve this status code and update database info for previous authentication request.

Phone ID: (unique ID of the device, in an embodiment used with IPHONE/IPOD) For example, detail on following HTTP post message is as shown here:
215623542145421452455256521999882654526s54d1rj hb34fgSfv109e96a3bP0d29de e4fa2b065c924ae350562f 8b16
2 This post is done from iPhone
1 Unlock Request (use value 2 while sending status)
0 Status (only useful for status message)
09e96a3bf0d29dee4fa2b065c924aeeerggv1546e350562f 8b16 Phone Id (in an embodiment, used for iPhone).

Unlock Request message will be supplied in variable "msg" in HTTP Post method. Web server can get this variable value using Request method.
 string Req=Request["msg"]; // Get Supplied Message
Note: Web server shall send Response code (e.g., 200—OK, 401—Unauthorized, 500—Server's error).

Web Server Functionality

Web server authenticates user's Unlock Request message upon receiving message from mobile application. If request is authenticated successfully, it calls ITS provided API as follows:
1. Add reference to the project of the supplied dll file.
2. Import Namespace using Encryption;
3. Create class object.
4. Call API function to get encryption string. (TimerVal is the time in minutes for encryption key to be valid. strEncrypted is the encrypted string and web server needs to send it to the mobile application.
5. Web server will send encrypted string to mobile application using a .net API. If Authentication fails, the web server sends one character status code to Mobile Application:
 Header 3 Char (Total length of the message, Status Code+Error string length)
 Status 1 Char
 Error message string
 Status code to Message mapping:
 1 LockID is not Valid
 2 Phone number is not Valid
 3 Bad Request Mobile application checks status code and does following:
When the status code is "0"—connect to hardware device using BlueTooth or Wi-Fi interface and send received encrypted message to hardware device.
When the status code is greater than "0"—display error string received in message to user.

Assumptions:
Mobile Application sends information to provided URL.
Mobile Application sends message to Web Server using HTTP post.
Web server uses variable name "msg" to get message from ITS mobile application.
Web server sends response message to ITS mobile application within 2 seconds from request received.

As can be seen from the above, the described principles allow a remote administrator to remotely control and track access to a specific lock. The administrator is able to observe lock activity such as when the lock was authorized and also when it was opened, and is also able to see error messages generated during or as a result of the opening or attempted opening. However, it is contemplated that other implementations of the disclosure may differ in detail from the foregoing examples.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method of providing, by a networked server via a Web Portal, security services for managing physical access via commands transmitted wirelessly between a requesting mobile wireless device and a controller for actuating a physical access control device, the method comprising:
 receiving, by the networked server via the Web Portal, an authentication request issued by the requesting mobile wireless device, the authentication request comprising an authentication information including:
  information identifying the requesting mobile device, and
  information identifying the physical access control device;
authenticating, by the networked server, the authentication request issued by the requesting mobile wireless device, and in response to the authenticating:
  generating, by the networked server, a response message; and
  forwarding to the requesting mobile wireless device, by the networked server, the response message so as to enable the controller of the physical access control device to authenticate a command message, from the requesting mobile wireless device, prior to completing an access control operation, on the physical access control device, corresponding to the command,
wherein the requesting mobile wireless device is configured to communicate, during the receiving an authentication request, in one of multiple supported mobile wireless modes with the networked server including: a first mode having a communications path including a local communication link with a local wireless router, and a second mode having a communications path that by-passes the local wireless router,
wherein the response message comprises a first encoded portion and a second encoded portion,
wherein a first encryption engine generates the first encoded portion based upon a command for the physical access control device,
wherein a second encryption engine generates the second encoded portion based upon a unique series of a plurality of identifiers stored for the physical access control device,
wherein the command message comprises the first encoded portion and the second encoded portion, and
wherein the authenticating the command message comprises decoding the first encoded portion and the second encoded portion.

2. The method of claim 1 wherein the physical access control device is selected from the group consisting of: a lock device, a garage door device, and a gate device.

3. The method of claim 1 wherein the response message comprises a plurality of encoded shape patterns.

4. The method of claim 3 wherein the shape patterns are geometric shape patterns.

5. The method of claim 1 wherein the response message includes an Advanced Encryption Standard (AES) protocol encryption.

6. The method of claim 1 wherein the response message comprises one or more encrypted space values.

7. The method of claim 1 wherein the response message is authenticated by the controller by performing a matching operation to a unique series of a plurality of identifiers accessible by the controller for the physical access control device.

8. The method of claim 1 wherein the information identifying the physical access control device comprises a Media Access Control (MAC) address and a lock identification number of the physical access control device.

9. An encrypted security system for controlling physical access and including a security server, a local wireless router, and a physical access control device;
  wherein the security server is configured with a server processor and a server non-transitory computer-readable medium including computer-executable instructions for:
    receiving, by the security server via a Web Portal, an authentication request issued by a requesting mobile wireless device, the authentication request comprising an authentication information including:
      information identifying the requesting mobile wireless device, and
      information identifying the physical access control device;
    authenticating, by the security server, the authentication request, and in response to the authenticating:
      generating a response message; and
  wherein a controller for the physical access control device is configured with a controller processor and a non-transitory computer-readable medium including computer-executable instructions for:
    receiving a command message from the requesting mobile wireless device, and
    authenticating the command message prior to completing the command for the physical access control device;
  wherein the requesting mobile wireless device is configured to communicate, during the receiving an authentication request in one of multiple supported mobile wireless modes with the security server including: a first mode having a communications path including a local communication link with the local wireless router, and a second mode having a communications path that by-passes the local wireless router,
  wherein the response message comprises a first encoded portion and a second encoded portion,
  wherein a first encryption engine generates the first encoded portion based upon a command for the physical access control device,
  wherein a second encryption engine generates the second encoded portion based upon a unique series of a plurality of identifiers stored for the physical access control device,
  wherein the command message comprises the first encoded portion and the second encoded portion, and
  wherein the authenticating the command message comprises decoding the first encoded portion and the second encoded portion.

10. The system of claim 9 wherein the response message comprises a plurality of encoded shape patterns.

11. The system of claim 10 wherein the shape patterns are geometric shape patterns.

12. The system of claim 9 wherein the command message includes an Advanced Encryption Standard (AES) protocol encryption.

13. The system of claim 9 wherein the response message comprises one or more encrypted space values.

14. The system of claim 9 wherein the controller is configured to authenticate the command message by performing a matching operation to a unique series of a plurality of identifiers stored in the non-transitory computer readable medium.

* * * * *